Dec. 6, 1966 B. GLASSMAN 3,290,061
MANIFOLDING DEVICE
Filed March 31, 1965 2 Sheets-Sheet 1

INVENTOR:
BARNETT GLASSMAN

BY
ATTORNEY

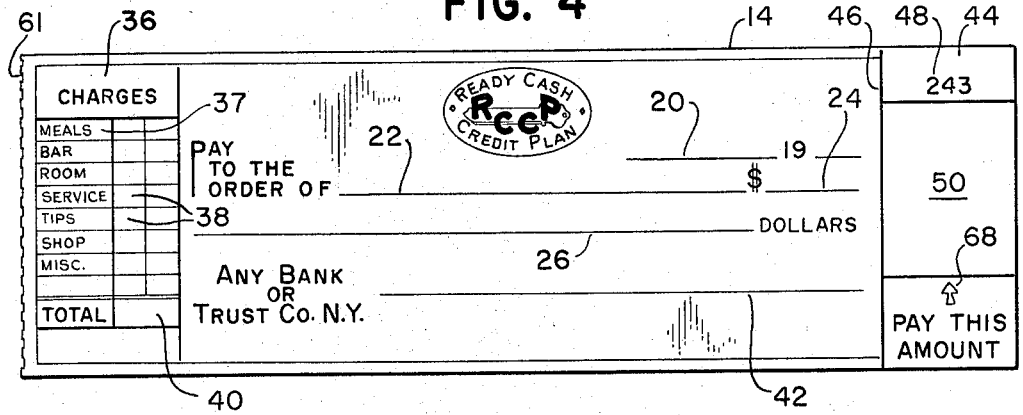
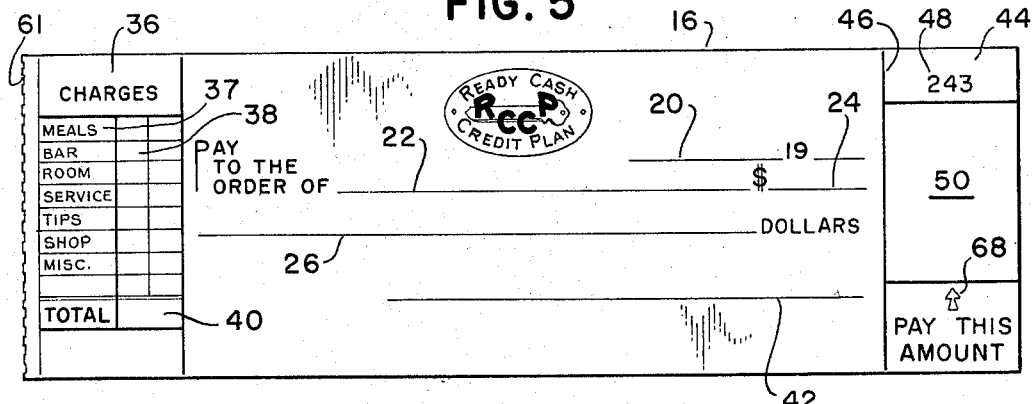
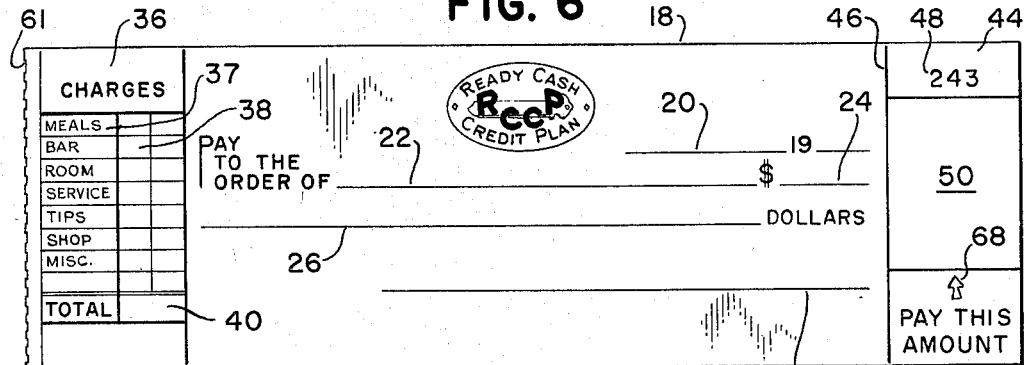
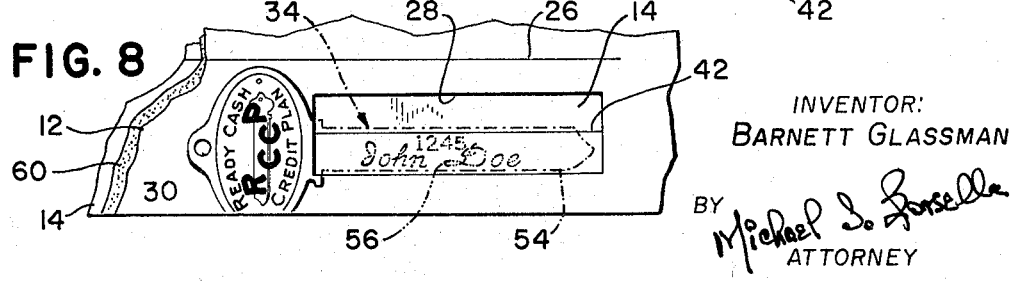

United States Patent Office 3,290,061
Patented Dec. 6, 1966

3,290,061
MANIFOLDING DEVICE
Barnett Glassman, New York, N.Y., assignor to Nationwide Financial Corporation, New York, N.Y., a corporation of New York
Filed Mar. 31, 1965, Ser. No. 444,163
5 Claims. (Cl. 282—23)

The present invention relates to manifolding devices and more particularly to a duplicating pack capable of use in numerous different associations, but primarily intended to be employed in the writing of a check in conjunction with means for immediately verifying the signature on the check. Simultaneously a plurality of duplicate data slips are made available for various parties interested in the resulting transaction.

Heretofore various types of manifolding devices have been employed to duplicate records, data, and indicia of commercial transactions, but none of these have embodied the writing of a negotiable check in conjunction with means for immediately verifying the authenticity of the signature on the check.

The invention consists essentially in the details of construction herein shown and contemplates providing a novel self-contained assemblage of four superimposed data slips, embodying in combination, carbon sheets or media adopted for manifolding writing. A cutout in the topmost slip is superimposed over a selected elemental area of the second slip comprising substantially a negotiable instrument, such as a check. The cutout is disposed in such relationship to the second slip that the signature line of the instrument is exposed, and the area adjacent thereto is adapted to receive characters and ciphers forcibly impressed thereon as by a type of platen, for signature verifying purposes, as hereinafter more fully explained. The remaining slips each contain thereon reproduced data of the check transaction and constitute an identical record thereof.

It is therefore one of the objects of the present invention to provide novel means for writing a check while simultaneously reproducing the data thereon on a plurality of non-negotiable slips.

A further object of the invention is to provide means for immediately vertifying the authenticity of the signature on said check.

Another object of the invention is to provide an improved arrangement of superimposed record slips having a copying agency therebetween, and detachably connected together in such manner that corresponding areas thereof are in registry, and writing upon the topmost slip, by stylus, pen, pencil, imprinting, or the like will produce identical copies.

Still another object of the invention is to provide an improved manifolding device of the above indicated nature with components economically and simply constructed.

Further objects and advantages and features will appear more fully hereinafter from a consideration of the detailed description which follows, taken together with the accompanying drawings wherein one embodiment of the invention is illustrated by way of example. It is to be expressly understood however that the drawings are for purposes of illustration only, and are not to be construed as defining the limits of the invention, reference being had for this purpose to the appended claims.

In the drawings wherein like reference characters designate like components:

FIG. 4 is a plan view of a component of the assembly of FIGS. 1 and 2 immediately beneath the component of FIG. 3.

FIG. 5 is a plan view of a component immediately beneath the component shown in FIG. 4.

FIG. 6 is a plan view of a compound immediately beneath the component shown in FIG. 5.

FIG. 8 is a plan view showing the platen of FIG. 7 in use with the topmost component of FIG. 3.

Figure 1:
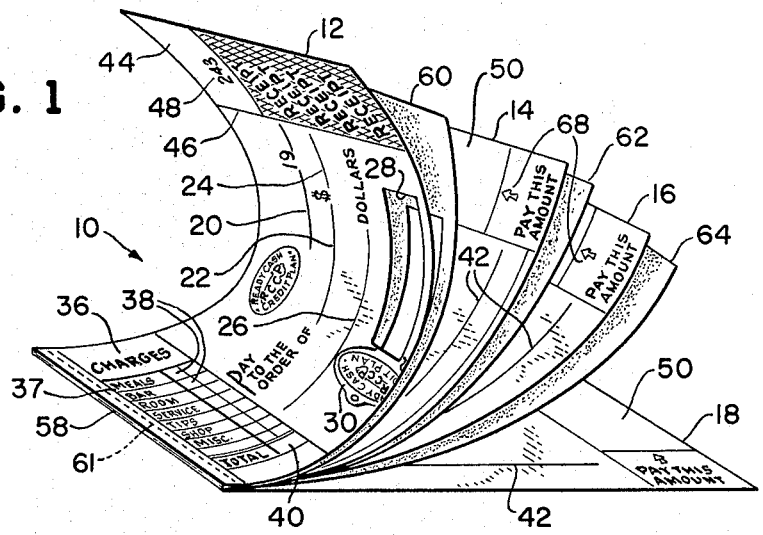
FIG. 1 is a perspective view of a complete assembly of the novel manifolding device showing the relationship between the components thereof.
Figure 2:
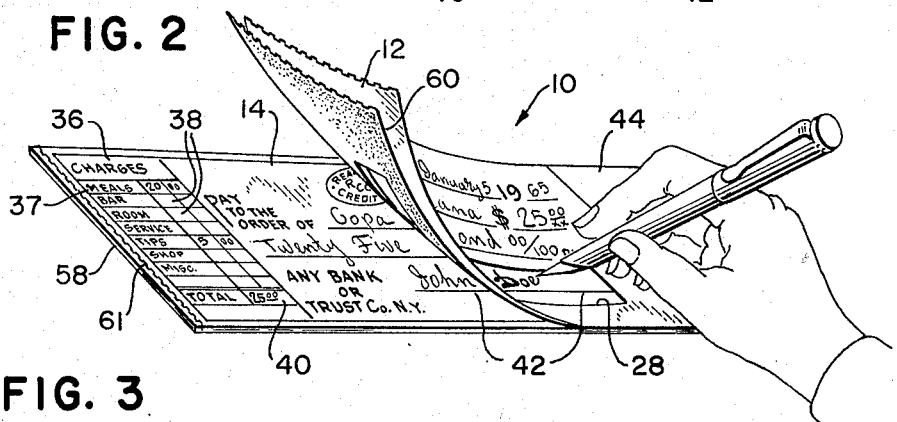
FIG. 2 is a perspective view of the assembly of FIG. 1 in use with the topmost component detached in part to reveal an area of an underlying component.
Figure 3:
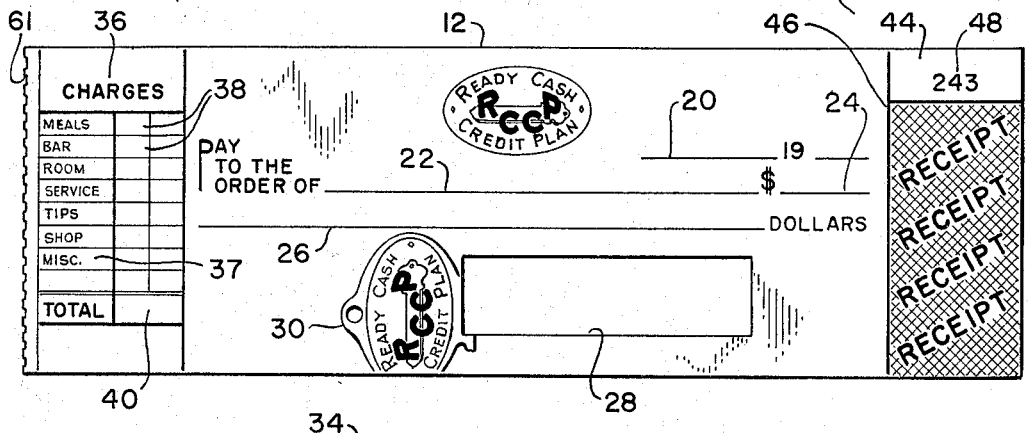
FIG. 3 is a plan view of the topmost component of the assembly shown in FIGS. 1 and 2.

Referring now to the drawings and more particularly to FIGURES 1 and 2, there is shown a complete assembly of a manifolding device generally designated by the numeral 10. The assembly 10 comprises various components such as a topmost slip 12 (FIG. 3), a second slip 14, also referred to as a check (FIG. 4), a penultimate slip 16 and a bottom slip 18, identical thereto (FIGS. 5 and 6).

Figure 7:
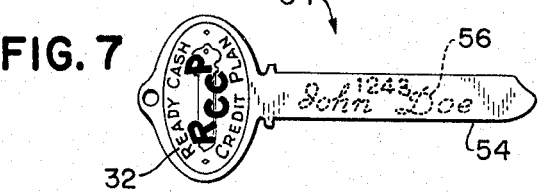
FIG. 7 is a plan view of an embossed platen used in conjunction with the manifolding device for signature verifying purposes.

Referring now to the top slip 12 (FIG. 3) it will be observable that all of the elements required of check or negotiable instrument are contained thereon, such as a dateline 20, payee line 22 and numeral and letters amount lines 24 and 26 respectively, excepting that a cutout 28 is provided in the area thereof which ordinarily would contain the signature of the maker of the instrument. Adjacent the cutout 28 and in precise relationship thereto as hereafter explained, is imprinted an exact outline 30 of substantially an entire key top 32 of a platen type key 34 (FIG. 7).

The top slip 12 also embodies a "Charges" area 36 containing a columnar enumeration 37, of various items such as food, libations, lodgings and the like, and provides linearly encompassed areas 38 alongside each item for recording the respective costs thereof, and a cumulative "total" area 40. It is understood however that the arrangement and composition of items shown and described in the "charges" area is for purposes of example only and may be readily varied as desired without affecting the scope of the invention.

It is important to note that the second slip or check 14, as well as the penultimate and bottom slips 16 and 18, contain on their corresponding areas, an identical "charges" area identical in every respect including size, configuration and relative arrangements of the columnar enumeration 37, and the areas 38 and 40 as that on slip 14, so that in their attached and assembled position, as in the assembly 10, the corresponding points on each of the four slips 12, 14, 16, and 18 will be in exact superimposition and registry.

Referring now to FIGURE 4, there is shown the record slip, or check component 14 of the assembly 10. The check 14 is the direct signature-receiving component of the assembly and contains thereon a signature line 42 for the maker of the check. In addition to the "charges" area herein before described, the check 14 bears thereon the date line 20 and numeral, letters, and amount lines 24 and 26 identical to and identically located as their corresponding counterparts 20, 22, 24 and 26 on the top slip 12.

It will now be noted that the signature line 42 on the check or second slip 14 is positioned in such relationship to the cutout 28 in the top slip 12, that in the assembled superimposed position, the signature line 42 is exposed by the cutout 28 and falls approximately in the horizontal center thereof, as shown in FIG. 8.

Referring now to FIGURES 5 and 6, it will be seen that the penultimate and bottom slips 16 and 18 are identical to one another and contain thereon in corresponding and exact positions the check indicia lines 20, 22, 24, 26 and 42, the object of the slips 16 and 18 being primarily to serve as exact copies of the check 14.

The components 12, 14, 16 and 18 contain an area 44 on the right side of the line 46 which is identical in size. The indicia in this area contains the check number, as at 48 and on slips 14, 16, and 18 an area 50 for recording such data for example as any discounts thereon, however on the top slip 12 such corresponding area is simply marked to indicate that the top slip 12 is a receipt record and the purpose thereof in operation will be more fully explained, in the preferred manner of operation that follows, as well as the specific function of the area 50.

Referring now to FIGURE 7, the platen-like key 34 contains keytop 32 corresponding in size exactly to the outline 30 on the top slip 12. The key 34 comprises a flat shank portion 54 adaptable to have embossed thereon certain numerals and letters 56 as may be desired, as for example, the name and number of a subscriber or member of a group, association, or the like. When the key 34 is placed upon the top slip 12 so that the keytop 32 covers the outline 30, then the flat shank 54 extends in the lower area 56 of the cutout 28 contiguous to and beneath the signature line 42 on the check 14 as shown in FIGURE 8, and it follows that a like relationship will exist with respect to the slips 16 and 18 as well.

Referring now to FIG. 1, the assmbled components 12, 14, 16, and 18 are shown bound into a booklet 58, in a readily detachable manner as for example by means of perforated line 61. The components of the booklet 58, to wit; the top slip 12, the check 14, the penultimate 16, and the bottom slip 18 each contain therebetween a media adapted for manifold writing such as for example carbon leaves 60, 62, and 64, but not necessarily limited thereto. The backs of the components 12, 14 and 16 may themselves be coated with a reproducing media in any manner well known to those skilled in the art, to equal purpose and advantage. The carbon leaves 62 and 64 are identical in size and completely cover the faces the penultimate slip 16 and the bottom slip 18. The carbon leaf between the top slip 12 and the check 14 however is cut away in such manner that the area on the check 14 exposed by the cutout 28 is not covered, thereby allowing direct access to the signature line 42 through the cutout 28, by pen or stylus (FIG. 2).

Having thus described the invention, it will now be apparent that there are provided means for writing a check bearing the original signature of the maker, while producing simultaneously a plurality of copies.

A preferred manner of operation and utilization of the invention is the employment thereof in conjunction with a credit plan wherein a group of preselected subscribers purchase products and services from merchant members of the plan or retailers. An inherent disadvantage of such plans heretofore has been that the retailers did not receive immediate payment for their goods and services. This disadvantage is effectively eliminated by applying the within invention. Upon receiving the goods or services a plan member may present a key 34 assigned to him and bearing his signature and plan membership number embossed thereon. He may then record the nature of the goods or services received and the cost thereof on on the top slip 12 of a booklet 58 in the designated "charges." Such recordation will simultaneously be reproduced upon the check 14 and the remaining components 16 and 18 of the booklet. The subscriber may then proceed to make out the top slip 12 in the manner of a check to the order of the retailer by filling in the appropriate data on the lines 20, 22, 24 and 26, which in like manner will be simultaneously reproduced upon the actual check 14, and the remaining slips 16 and 18.

The signature of the subscriber is affixed on the signature line 42 directly upon the face of the check 14 through the cutout 28, as shown in FIGURE 2, and it will be noted that the check 14 is the sole component of the assembly 10 which bears the original signature of the subscriber.

To verify the authenticity of the subscriber's signature, the retailer may simple place the platen-like key 34 in such position that the top 32 thereof matches the outline 30 on the top slip 12. Visual comparison will immediately be available. By passing the key 34 placed in the position herein described and the booklet 58 through a stamping machine (not shown here), commonly known in the art, the signature and number of the subscriber will be reproduced in the area 56 immediately beneath and contiguous to the signature line 42, upon the check 14 and the slips 16 and 18. There are thus provided means for writing a negotiable check and immediately verifying the authenticity of the signature thereon, while simultaneously reproducing the check data on a plurality of identical non-negotiable slips.

The various components of the booklet 58 may now be readily detached along the perforated line 61, and the retailer may retain the check 14, thereby receiving immediate payment for his goods or services. Referring to FIGURES 4 to 6, the words "PAY THIS AMOUNT" will be noted beneath an arrow 68 pointing towards the area 50. The area 50 may be advantageously employed to record the net amount actually paid by the bank to the retailer. It is an inherent feature in plans of this nature that the participating retailers allow a discount from the face value of the goods or services sold. In the present example the retailer is not credited with the actual face amount shown in lines 24 and 26 of the check 14, but with a net amount which consists of the face amount less an agreed upon bank discount. The net amount is arrived at in any approved manner such as by processing the check 14 through a discounting machine (not shown here), and the net amount which the bank pays to the retailer is recorded in the area 50 of the check 14.

The remaining components of the booklet 58 may preferably be distributed as follows: the top slip 12, which it will be noted bears no signature or duplication thereof would be retained by the subscriber as his own receipt of the check transaction; the penultimate slip 16 may be retained by the retailer for this records, while the bottom slip 18 may be forwarded to the plan or to the bank for use in compiling an itemized monthly statement for the subscriber. It will further be noted that a greater number of copies of the check 14 may be made by assembling the booklet 58 with additional slips identical to the slips 16 and 18.

While the invention has been illustrated and described with respect to a preferred embodiment thereof, it will be understood that it is intended to cover all changes and modifications which do not constitute departures from the spirit of the invention and the scope of the claims.

What is claimed is:

1. In a manifolding device adapted for writing a check simultaneously reproducing the check data on a plurality of non-negotiable record slips superimposed and in registry, the combination comprising, a top slip and a second slip comprising a check, a signature line on the check, a cutout in the top slip disposed to provide access to the signature line, a keytop outline disposed on the top slip adjacent said cutout, a platen-like key adapted to be superimposed on said outline, said key including an elongated shank having a signature embossed thereon and extending over the area adjacent the signature line on the check to provide a comparison upon the operation of signing the check through said cutout with the signature embossed on said key.

2. The manifolding device claimed in claim 1 wherein said key embodies a keytop corresponding in size to said keytop outline disposed on said top slip.

3. As an article of manufacture, a device for manifold writing including means for writing a check and immediately verifying the signature on the check comprising, a plurality of slips bearing the elements of a check thereon, said slips including a top slip having a cutout therein, a slip beneath said top slip in the form of a check having a signature line visible through said cutout, said slips being superimposed and bound in booklet form, a penultimate slip and bottom slip included in said booklet, a reproducing media interposed between each slip, a key outline positioned adjacent said cutout on the top slip, a matching platen-like key having a shank with a signature embossed thereon adapted to be superimposed on said key outline so that shank extends over said cutout and adjacent to said signature line to provide an immediate visual comparison of signatures upon the operation of signing the check through said cutout.

4. The article of manufacture claimed in claim 3 wherein said platen-like key is adapted to emboss the signature thereon onto the check and remaining slips to provide a comparison of signature between the signature embossed on the check by said key and a signature affixed onto said check through the cutout upon the operation of signing said check.

5. The article of manufacture claimed in claim 3, wherein said device for manifold writing is adapted to be processed through a discounting machine, and said slip beneath the top slip and the penultimate slip and bottom slip contain an area for recording thereon a net amount computed by said machine.

References Cited by the Examiner
UNITED STATES PATENTS

| | | | |
|---|---|---|---|
| 493,223 | 3/1893 | Schafer | 283—7 |
| 1,611,383 | 12/1926 | Schoonmaker | 283—7 |
| 2,310,394 | 2/1943 | Case | 283—58 X |
| 3,113,516 | 12/1963 | Johnson | 283—58 X |
| 3,147,991 | 9/1964 | Heinz | 282—23 |

LAWRENCE CHARLES, *Primary Examiner.*